(12) United States Patent
Kim et al.

(10) Patent No.: US 8,729,218 B2
(45) Date of Patent: May 20, 2014

(54) MANUFACTURING METHOD OF POLYASPARTIC ACID USING MALEIC ANHYDRIDE

(75) Inventors: Jeong Gon Kim, Daejeon (KR); Jong Hwa Lee, Daejeon (KR); Sung Duck Seo, Daejeon (KR); Yeong Im Yu, Daejeon (KR)

(73) Assignee: Aekyung Petrochemical Co., Ltd., Seoul (KR)

( * ) Notice: Subject to any disclaimer, the term of this patent is extended or adjusted under 35 U.S.C. 154(b) by 1130 days.

(21) Appl. No.: 12/442,886

(22) PCT Filed: Apr. 17, 2007

(86) PCT No.: PCT/KR2007/001855
§ 371 (c)(1),
(2), (4) Date: Nov. 17, 2009

(87) PCT Pub. No.: WO2008/038874
PCT Pub. Date: Apr. 3, 2008

(65) Prior Publication Data
US 2010/0076161 A1    Mar. 25, 2010

(30) Foreign Application Priority Data

Sep. 25, 2006    (KR) .................. 10-2006-0092607

(51) Int. Cl.
*C08G 73/10*    (2006.01)
*C08G 69/00*    (2006.01)

(52) U.S. Cl.
CPC .................................. *C08G 73/1092* (2013.01)
USPC ............................. 528/363; 528/489; 528/367

(58) Field of Classification Search
USPC ........................................ 528/363; 525/420
See application file for complete search history.

(56) References Cited

U.S. PATENT DOCUMENTS

| | | | | |
|---|---|---|---|---|
| 5,221,733 A | * | 6/1993 | Koskan et al. | ................. 530/333 |
| 5,292,858 A | * | 3/1994 | Wood | ............................ 528/345 |
| 5,371,180 A | | 12/1994 | Groth et al. | |
| 5,373,088 A | | 12/1994 | Koskan et al. | |
| 5,466,779 A | | 11/1995 | Ross | |
| 5,508,434 A | | 4/1996 | Batzel et al. | |
| 5,521,257 A | * | 5/1996 | Ross | ............................. 525/420 |
| 5,610,255 A | | 3/1997 | Groth et al. | |
| 5,612,447 A | * | 3/1997 | Freeman et al. | ............... 528/328 |
| 5,714,588 A | | 2/1998 | Purchio et al. | |
| 5,770,553 A | | 6/1998 | Kroner et al. | |

FOREIGN PATENT DOCUMENTS

| | | | |
|---|---|---|---|
| CN | 1146210 A | | 3/1997 |
| CN | 1398799 A | | 2/2003 |
| EP | 747417 A1 | * | 12/1996 |
| JP | 8-291218 A | | 11/1996 |
| KR | 2003-0073994 A | | 9/2003 |

* cited by examiner

*Primary Examiner* — Randy Gulakowski
*Assistant Examiner* — Rachel Kahn
(74) *Attorney, Agent, or Firm* — The Webb Law Firm

(57) ABSTRACT

The present invention relates to a manufacturing method of polyaspartic acid. More particularly, the present invention relates to a manufacturing method of polyaspartic acid comprising steps of carrying out condensation polymerization of maleic anhydride and ammonia in the presence of a polar solvent without active hydrogen to give polysuccinimide and hydrolyzing the resulting polysuccinimide to obtain polyaspartic acid. Specifically, the present invention is characterized in that the quality of the synthetic product, polysuccinimide and polyaspartic acid, is improved by minimizing the decomposition and the degradation of the maleic acid during the process of the polymerization resulted from the introduction of substituent to maleic acid.

9 Claims, No Drawings

MANUFACTURING METHOD OF POLYASPARTIC ACID USING MALEIC ANHYDRIDE

TECHNICAL FIELD

The present invention relates to a manufacturing method of polyaspartic acid. More particularly, the present invention relates to a manufacturing method of polyaspartic acid comprising steps of carrying out condensation polymerization of maleic acid and ammonia in the presence of a polar solvent without active hydrogen to give polysuccinimide and neutralizing the resulting polysuccinimide to obtain polyaspartic acid. Specifically, the present invention is characterized in that alkyl maleate substituted by an alkyl residue is used in order to minimize the decomposition and the degradation of the maleic acid during the process of the polymerization.

BACKGROUND ART

There have been two kinds of method for the manufacture of polyaspartic acid by polymerizing maleic acid and ammonia, i.e., a liquid phase polymerization method and a solid phase polymerization method, which is carried out in the presence or the absence of a solvent, respectively.

For a solid phase polymerization method, which generally does not require a solvent, derivatives of maleic acid are reacted with a source of ammonia and then heated directly for the polymerization. Because the polymerization is carried out in a solid phase using solid reacting materials, handling is not easy and foaming occurs inevitably. As a result, heat transfer efficiency of the process is low. Thus, the reaction temperature has to be increased and the reaction time has to be extended to overcome said problems associated with the method. However, higher the reaction temperature, more of the reaction mixture converts to a foamed solid, which impairs the heat transfer efficiency of the process, while the reaction temperature has to be increased and the reaction time has to be extended to achieve a more efficient reaction. Moreover, because the reacting materials are poorly admixed, molecular weight of the final product generally becomes to be smaller.

For a liquid phase polymerization method using a solvent, degree of foaming varies depending on the characteristics of the solvent used. When a polar solvent without active hydrogen is used, foaming can be prevented but the product tends to have a higher level of heat degradation, low quality and poor color. If a weakly polar solvent or a nonpolar solvent that is different from said polar solvent is used, the degree of foaming can be lowered but cannot be prevented. In addition, due to poor stability maleic acid salts are decomposed by heat during the polymerization process. As a result, quality of the synthetic product becomes deteriorated.

Polyaspartic acid is a polymer produced from the hydrolysis of polysuccinimide and is soluble in water. As a biodegradable polymer, it can be applied to various fields. Particularly, it can be used as a builder for detergent, a water-treatment agent for boiler and cooling water, a product adopted for agricultural use, a personal product such as shampoo, and a vehicle for drug delivery in pharmaceuticals and agricultural chemicals. Typically, polyaspartic acid is prepared by hydrolyzing polysuccinimide that is obtained from condensation polymerization of dibasic acid such as maleic acid and fumaric acid with ammonia or from condensation polymerization of L-aspartic acid or DL-aspartic acid. A known process for producing polyaspartic acid includes the following.

U.S. Pat. No. 5,466,779 discloses a method of preparing polyaspartic acid, which comprises the steps of reacting ammonia with maleic anhydride while maintaining the temperature at 100° C. to 110° C. to give maleamic acid, polymerizing the obtained maleamic acid to polysuccinimide by heating the acid to a reaction temperature of from 180° C. to 240° C., and hydrolyzing the obtained polysuccinimide with caustic soda or other corresponding base to produce polyaspartic acid.

U.S. Pat. No. 5,373,088 discloses a method of producing polyaspartic acid, which comprises the steps of reacting maleic acid and ammonia to produce an ammonium maleate, polymerizing the obtained ammonium maleate at temperature of from 220° C. to 240° C. for 7 to 10 hours to produce a polysuccinimide, and hydrolyzing the obtained polysuccinimide to produce polyaspartic acid.

U.S. Pat. No. 5,508,434 discloses a method of producing polyaspartic acid, which comprises the steps of heat-polymerizing aspartic acid in the presence of a sulfur-containing dehydrating agent to obtain polysuccinimide with relatively high molecular weight, and hydrolyzing the obtained polysuccinimide to produce polyaspartic acid.

U.S. Pat. No. 5,371,180 discloses a method of producing polyaspartic acid, which comprises the steps of polymerizing fumaric acid or maleic acid with a ammonia-containing agent including urea, carbamic acid, ammonium carbonate, ammonium bicarbonate and diammonium carbonate in an amount of from 0.95 to 1.05 mol per one mole of dibasic acid at the temperature of from 160° C. to 220° C. to give polysuccinimide, and hydrolyzing the obtained polysuccinimide with caustic soda or other corresponding base to produce polyaspartic acid.

U.S. Pat. No. 5,714,588 discloses a method of producing polyaspartic acid, which comprises the steps of heat-polymerizing at the temperature of from 150° C. to 220° C. aspartic acid, fumaric acid, maleic acid or maleic anhydride with ammonia, that is specifically selected in consideration of each organic acid used, in the presence of various kinds of solvents to produce polyaspartic acid.

On the other hand, Korean Laid-open Patent Application No. 2003-0073994 describes a method of producing polyaspartic acid comprising steps of heat-polymerizing dibasic acid with ammonia in the presence of silicone solvent to give polysuccinimide and hydrolyzing the obtained polysuccinimide to produce polyaspartic acid.

When a solid phase polymerization is employed among previous methods, the reaction temperature has to be increased and the reaction time has to be extended due to the poor heat-transfer efficiency. As a result, energy consumption is high and the obtained polymer resin is highly viscous so that water produced according to the proceeding of the reaction is not removed effectively, causing a foaming phenomenon. Accordingly, problems arise including that an abnormally large manufacturing unit has to be constructed, etc. Moreover, as the unreacted materials cannot be effectively admixed, the polymer obtained has a weight average molecular weight of only from 3000 to 5000.

Meanwhile, in a liquid phase polymerization method, degree of foaming varies depending on characteristics of the solvent used. When a polar solvent without active hydrogen is used, foaming can be prevented but the product tends to have a higher level of heat degradation, low quality and poor color. If a weakly polar solvent or a nonpolar solvent is used, the degree of foaming can be lowered but cannot be prevented. In addition, due to poor stability maleic acid salts are decomposed by heat during the polymerization process. As a result, quality of the synthetic product becomes deteriorated.

Under the circumstances, there is a need for developing a technology of preparing a polymer product with high quality while foaming in reacting materials is prevented.

DISCLOSURE

Technical Problem

In order to solve the problems described above, inventors of the present invention used a liquid polymerization process which has a good heat transfer efficiency and modified the dibasic acid by using an alcohol to prevent degradation of dibasic acid by heat. Particularly, when maleic anhydride and alcohol were reacted to give monoalkyl maleate, the obtained monoalkyl maleate was reacted with ammonia and subjected to condensation polymerization in the presence of a polar solvent without active hydrogen to give polysuccinimide, which was then neutralized to produce polyaspartic acid, it was found that polyaspartic acid with weight average molecular weight of from 10,000 to 20,000 and a content of carboxyl group at least of 93 is obtained with production yield of at least 98 mol %. Based on such findings, the present invention was completed.

As such, the object of the present invention is to provide a novel method of manufacturing polyaspartic acid, in which polyaspartic acid can be economically prepared under the conditions of low reaction temperature and short reaction time by carrying out condensation polymerization in the presence of a polar solvent without active hydrogen, deterioration in quality of the polymer product is prevented by using an alcohol with an alkyl group so that the level of degradation of dibasic acid by heat is reduced, and a foaming phenomenon is prevented also.

Technical Solution

In order to achieve the object described above, the present invention provides a manufacturing method of polyaspartic acid. More particularly, the present invention provides a manufacturing method of polyaspartic acid comprising steps of carrying out condensation polymerization of maleic acid and ammonia in the presence of a polar solvent without active hydrogen to give polysuccinimide and hydrolyzing the resulting polysuccinimide to obtain polyaspartic acid.

Specifically, the present invention relates to a method of manufacturing polyaspartic acid with high yield and minimal heat degradation, wherein said method comprises steps of: a) reacting maleic anhydride and an alcohol to give monoalkyl maleate compound; b) reacting thus obtained monoalkyl maleate compound and ammonia gas or an aqueous solution of ammonia to give a reaction solution of alkyl ammonium salts; c) adding a polar solvent without active hydrogen to thus obtained reaction solution of alkyl ammonium salts and heating the mixture to effect condensation polymerization for obtaining polysuccinimide; and d) cooling and neutralizing the resulting polymer.

In order to prevent any foaming during the process, a liquid polymerization method with the presence of a polar solvent without active hydrogen was employed in the present invention. Further the present invention is characterized in that, in order to minimize the degradation of dibasic acid by heat, which occurs during process of a liquid polymerization, a modified dibasic acid was used so that polyaspartic acid can be produced with high yield via an economically favorable reaction at low reaction temperature and short reaction time.

Inventors of the present invention are first to find that, when modified monoalkyl maleate is subjected to condensation polymerization in the presence of a polar solvent, high molecular weight polyaspartic acid having weight average molecular weight of from 10,000 to 20,000 and a content of carboxyl group at least of 93% can be obtained with production yield of at least 98 mol %, and therefore completed the present invention. In this regard, the effect of the present invention can be obtained only when said two reaction conditions are satisfied simultaneously.

Polymerization according to the present invention was carried out in the presence of a polar solvent without active hydrogen in order to avoid the occurrence of foaming. Dibasic acid was modified in order to minimize its degradation by heat, which occurs during the process of a liquid polymerization. At high temperature, an organic acid tends to be easily degraded by heat, and therefore causing deterioration in color and quality of the product. To solve such problems, in the present invention an alkyl group was introduced to the dibasic acid so that the acid can become more resistant to the degradation by heat. Further, after reacting the raw materials having an alkyl group with ammonia, condensation polymerization was carried out in the presence of a polar solvent without active hydrogen to avoid any foaming. Still furthermore, by lowering the reaction temperature and avoiding any degradation by heat during the process of the polymerization, a new method of manufacturing polysuccinimide and polyaspartic acid by which the deterioration in quality of the product is avoided was established.

The present invention therefore can provide polyaspartic acid that is prepared by performing the condensation polymerization in the presence of a polar solvent without active hydrogen using dibasic acid substituted with an alkyl group and ammonia as raw reacting materials to give polysuccinimide having succinyl groups as a repeating unit, and by hydrolyzing the polysuccinimide to obtain polyaspartic acid. The method of the present invention is advantageous in that the problems including the foaming phenomenon which occurs during the process of a solid phase polymerization in prior art and deterioration in quality of the product can be avoided and minimization of energy cost which is the biggest merit of a liquid phase polymerization is achieved at the same time. Thus, a new manufacturing method of polyaspartic acid, which solves all the problems of prior art, is provided by the present invention.

Herein below, each step of the manufacturing method of the present invention is explained in detail. Characterization of the reaction product from each step was carried out using IR, NMR and/or GPC analysis.

The present invention is characterized in that, monoalkyl maleate which is substituted by an alkyl group via reaction of maleic anhydride as a dibasic acid and an alcohol is first produced, the resulting monoalkyl maleate is subjected to condensation polymerization with ammonia in the presence of a polar solvent without active hydrogen to give polysuccinimide, and the obtained polysuccinimide is hydrolyzed to provide polyaspartic acid.

The method of producing alkyl maleate at step a) described above involves the reaction between maleic anhydride and an alcohol as shown in Reaction scheme 1 below, and this reaction corresponds to a modification of maleic acid by which maleic acid, which is a dibasic acid, is converted to a monobasic acid, monoalkyl maleate. It is preferred to use 1 to 3 moles of alcohol per 1 mole of said maleic anhydride for the reaction of step a). More preferably, 1 to 2 moles of alcohol is used depending on each kind of alcohol employed. When the alcohol is used in an amount of more than 3 moles compared to 1 mole of maleic anhydride, a significantly longer reaction time is required and a great amount of calorie is also required for the reaction. It is preferred to use a linear or branched alcohol having 1 to 12 carbon atoms. More specific example includes ethanol, methanol, propanol, isopropanol, butanol, isobutanol, pentanol, isopentanol, hexanol, octanol, 2-ethylhexanol, nonanol, isononyl decanol and isodecanol, etc.

[Reaction scheme 1]

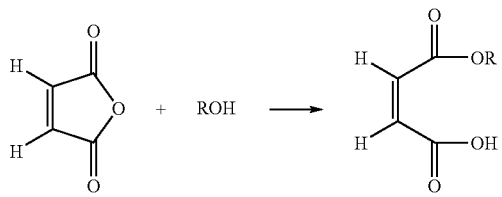

(R in the above Reaction scheme is a linear or branched alkyl group having 1 to 12 carbon atoms.)

It is preferred to react 0.8 to 2 moles of ammonia gas or an aqueous solution of ammonia per 1 mole of the monoalkyl maleate for step b) of the above-described method of the invention. When ammonia is used in an amount of more than 2 moles, color of polysuccinimide is significantly changed to brown, the content of carboxylic acid is reduced, and more side product of the salts is generated.

For step c) described above, as a polar solvent it is preferred to use at least one amide type solvent selected from n-methylpyrrolidone, dimethylformamide, dibutyl succinic acid, dipropyl succinic acid, diethyl succinic acid or dimethyl succinic acid. When it is used, the polar solvent is preferably employed in an amount of 100 to 400 parts by weight compared to the maleic anhydride used in said step a). More preferably, it is employed in an amount of 150 to 200 parts by weight. If more than 400 parts by weight of the polar solvent is employed, molecular weight of the polymer is decreased. If it is employed in less than 100 parts by weight, viscosity becomes higher, causing a difficulty in operating the process.

For a reaction condition for step c) described above, dibasic acid substituted with an alkyl group is reacted with ammonia and then the condensation polymerization can be carried out to obtain polysuccinimide. Reaction pressure during the condensation polymerization can be either increased or decreased. However, in every aspect it is advantageous to carry out the polymerization reaction under normal atmospheric pressure. Reaction temperature for the polymerization is preferably between 160 and 220° C. More preferably, it is between 170° C. and 180° C. In addition, an appropriate reaction time is between 3 to 11 hours. Preferably, it is between 6 to 8 hours. As a liquid polymerization method is employed, the reaction temperature can be reduced in the present invention compared to prior solid polymerization method. Additionally, the reaction time can be shortened so that energy can be more efficiently used in the present invention. By introducing an alkyl group to avoid the degradation of maleic acid by heat during the process of the solution polymerization, not only the degradation by heat but also the foaming can be prevented according to the present invention.

The polysuccinimide prepared according to the method of the present invention is cooled down to the temperature of 40~70° C. and then neutralized till pH becomes between 10 and 11 using an alkali metal or alkali earth metal. More preferably, sodium hydroxide is used. The sodium hydroxide is preferably used after being diluted to the solution of 25% to 50%. More preferably, when pH of the end point becomes 10.0, addition of sodium hydroxide is stopped and the neutralization process is completed. A solution of polyaspartic acid wherein the reaction has been completed is added to a separatory funnel to have the layer of polyaspartic acid and the layer of the polar solvent separated. Polymeric polyaspartic acid is then obtained as a product.

According to the above process of the present invention, yield for the obtained polyaspartic acid is close to 99% of the theoretical yield and the amount of carboxyl groups comprised in the polymer is from 90% to 95% of the theoretical value. Weight average molecular weight for thus prepared polymer is from 10,000 to 20,000, more preferably from 12,000 to 16,000.

BEST MODE

Hereinafter, the present invention is described in more detail based on the following examples. But, these examples are not intended to limit the scope of the present invention.

Example 1

98 g (1 mol) of maleic anhydride and 51 g (1.5 mol) of methanol were introduced to a 4-neck flask equipped with a thermometer, a stirrer, a decantor, a condensor and a device for injecting inert gas and the mixture was stirred at 65° C. for 30 min to give monomethyl maleate. 1.1 equivalents (1.1 mol) of an aqueous solution of ammonia were then added to the mixture to give ammonium salts. To the resulting mixture 150 g of n-methylpyrrolidone was added, and condensation polymerization was effected in oil bath at 170° C. for 6 hrs. As a result, methanol and water generated in accordance with the reaction were removed and the reaction mixture was converted to polymeric polysuccinimide.

The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 154 g. After the neutralization, the mixture comprising polyaspartic acid and n-methylpyrrollidone was separated using a separatory funnel into polyaspartic acid layer and n-methylpyrrolidone layer to give the product. Content of carboxyl group in the obtained polyaspartic acid was approximately 96%. Yield for the synthetic reaction was approximately 98 mol %, and the weight average molecular weight of the polymer was 15,000 according to GPC analysis result (GAP analysis result: herein below, Model 1515 by Water Company was used as a GPC instrument and a pump with isocratic type was also used).

Example 2

98 g (μmol) of maleic anhydride and 69 g (1.5 mol) of ethanol were introduced to a 4-neck flask equipped with a thermometer, a stirrer, a decantor, a condensor and a device for injecting inert gas to prepare monoethyl maleate. 1.1 equivalents (1.1 mol) of an aqueous solution of ammonia were then added to the mixture to give ammonium salts. Subsequently, to the resulting mixture 150 g of n-methylpyrrolidone was added, and then condensation polymerization was effected in oil bath at 170° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 152 g. After the neutralization, the mixture comprising polyaspartic acid and n-methylpyrrollidone was separated using a separatory funnel into polyaspartic acid layer and n-methylpyrrolidone layer to give the product. Content of carboxyl group in the obtained polyaspartic acid was approximately 95%. Yield for the synthetic reaction was approximately 98 mol %, and the weight average molecular weight of the polymer was 16,000 according to GPC analysis result.

Example 3

98 g (1 mol) of maleic anhydride and 90 g (1.5 mol) of propanol were introduced to a 4-neck flask equipped with a thermometer, a stirrer, a decantor, a condensor and a device for injecting inert gas to prepare monopropyl maleate. 1.1 equivalents (1.1 mol) of an aqueous solution of ammonia were then added to the mixture to give ammonium salts. Subsequently, to the resulting mixture 150 g of n-methylpyrrolidone was added, and then condensation polymerization was effected in oil bath at 170° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 152 g. After the neutralization, the mixture comprising polyaspartic acid and n-methylpyrrollidone was separated using a separatory funnel into polyaspartic acid layer and n-methylpyrrolidone layer to give the product.

Content of carboxyl group in the obtained polyaspartic acid was approximately 95%. Yield for the synthetic reaction was approximately 98 mol %, and the weight average molecular weight of the polymer was 15,000 according to GPC analysis result.

Example 4

98 g (1 mol) of maleic anhydride and 90 g (1.2 mol) of butanol were introduced to a 4-neck flask equipped with a thermometer, a stirrer, a decantor, a condensor and a device for injecting inert gas to prepare monobutyl maleate. 1.1 equivalents (1.1 mol) of an aqueous solution of ammonia were then added to the mixture to give ammonium salts. Subsequently, to the resulting mixture 150 g of n-methylpyrrolidone was added, and then condensation polymerization was effected in oil bath at 170° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 152 g. After the neutralization, the mixture comprising polyaspartic acid and n-methylpyrrollidone was separated using a separatory funnel into polyaspartic acid layer and n-methylpyrrolidone layer to give the product.

Content of carboxyl group in the obtained polyaspartic acid was approximately 95%. Yield for the synthetic reaction was approximately 99 mol %, and the weight average molecular weight of the polymer was 14,000 according to GPC analysis result.

Example 5

98 g (1 mol) of maleic anhydride and 110 g (1.25 mol) of pentanol were introduced to a 4-neck flask equipped with a thermometer, a stirrer, a decantor, a condensor and a device for injecting inert gas to prepare monopentyl maleate. 1.1 equivalents (1.1 mol) of an aqueous solution of ammonia were then added to the mixture to give ammonium salts. Subsequently, to the resulting mixture 150 g of n-methylpyrrolidone was added, and then condensation polymerization was effected in oil bath at 170° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 150.4 g. After the neutralization, the mixture comprising polyaspartic acid and n-methylpyrrollidone was separated using a separatory funnel into polyaspartic acid layer and n-methylpyrrolidone layer to give the product.

Content of carboxyl group in the obtained polyaspartic acid was approximately 94%. Yield for the synthetic reaction was approximately 99 mol %, and the weight average molecular weight of the polymer was 12,000 according to GPC analysis result.

Example 6

98 g (1 mol) of maleic anhydride and 120 g (1.17 mol) of hexanol were introduced to a 4-neck flask equipped with a thermometer, a stirrer, a decantor, a condensor and a device for injecting inert gas to prepare monohexyl maleate. 1.1 equivalents (1.1 mol) of an aqueous solution of ammonia were then added to the mixture to give ammonium salts. Subsequently, to the resulting mixture 150 g of n-methylpyrrolidone was added, and then condensation polymerization was effected in oil bath at 170° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 149.6 g. After the neutralization, the mixture comprising polyaspartic acid and n-methylpyrrollidone was separated using a separatory funnel into polyaspartic acid layer and n-methylpyrrolidone layer to give the product.

Content of carboxyl group in the obtained polyaspartic acid was approximately 93.5%. Yield for the synthetic reaction was approximately 99 mol %, and the weight average molecular weight of the polymer was 13,000 according to GPC analysis result.

Example 7

98 g (1 mol) of maleic anhydride and 120 g (1.03 mol) of heptanol were introduced to a 4-neck flask equipped with a thermometer, a stirrer, a decantor, a condensor and a device for injecting inert gas to prepare monoheptyl maleate. 1.1 equivalents (1.1 mol) of an aqueous solution of ammonia were then added to the mixture to give ammonium salts. Subsequently, to the resulting mixture 150 g of n-methylpyrrolidone was added, and then condensation polymerization was effected in oil bath at 170° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 150.4 g. After the neutralization, the mixture comprising polyaspartic acid and n-methylpyrrollidone was separated using a separatory funnel into polyaspartic acid layer and n-methylpyrrolidone layer to give the product.

Content of carboxyl group in the obtained polyaspartic acid was approximately 94%. Yield for the synthetic reaction was approximately 99 mol %, and the weight average molecular weight of the polymer was 12,000 according to GPC analysis result.

Comparative Example 1

98 g (1 mol) of maleic anhydride and 200 g of water were introduced to a 4-neck flask equipped with a thermometer, a stirrer, a decantor, a condensor and a device for injecting inert gas to prepare maleic acid. 1.1 equivalents (1.1 mol) of an aqueous solution of ammonia were then added to the mixture to give ammonium salts. Subsequently, to the resulting mixture 150 g of n-methylpyrrolidone was added, and then condensation polymerization was effected in oil bath at 170° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 136 g. After the neutralization, the mixture comprising polyaspartic acid and n-methylpyrrollidone was separated using a separatory funnel into polyaspartic acid layer and n-methylpyrrolidone layer to give the product.

Content of carboxyl group in the obtained polyaspartic acid was approximately 85%. Yield for the synthetic reaction was approximately 95 mol %, and the weight average molecular weight of the polymer was 11,000 according to GPC analysis result.

Due to the nature of a solution polymerization process, no swelling occurred. Content of carboxyl group, yield and molecular weight are all decreased compared to those of Examples of the present invention.

Comparative Example 2

98 g (1 mol) of maleic anhydride and 200 g of water were introduced to a 4-neck flask equipped with a thermometer, a stirrer, a decantor, a condensor and a device for injecting inert gas to prepare maleic acid. 1.1 equivalents (1.1 mol) of an aqueous solution of ammonia were then added to the mixture to give ammonium salts. Subsequently, condensation polymerization was effected in oil bath at 230° C. for 6 hrs. As a result, ethanol and water generated in accordance with the reaction were removed and the reaction mixture was converted to polymeric polysuccinimide. The reaction mixture was cooled down to 50° C. and 25% aqueous solution of caustic soda was added to neutralize the mixture. When pH of the solution became 10.0, addition of caustic soda was stopped and the neutralization process was completed. The amount of the 25% aqueous solution of caustic soda consumed for the neutralization was 136 g.

Content of carboxyl group in the obtained polyaspartic acid was approximately 85%. Yield for the synthetic reaction was approximately 86 mol %, and the weight average molecular weight of the polymer was 4,500 according to GPC analysis result. Significant swelling occurred in the reaction vessel during the polymerization process. Content of carboxyl group and molecular weight are all decreased compared to those of Examples of the present invention.

As it has been described above, polyaspartic acid prepared according to the method of the present invention comprises carboxyl groups in an amount of at least 93%, and the production yield was quite high, i.e., at least 98 mol %. In addition, weight average molecular weight was in the range of 12,000 to 16,000, which is higher than that of Comparative Example.

INDUSTRIAL APPLICABILITY

Compared to methods of prior art, the manufacturing method of polyaspartic acid according to the present invention has advantageous effects of saving energy cost, being free of any foaming and degradation by heat. Therefore polyaspartic acid can be produced with high yield and high molecular weight.

The invention claimed is:

1. Manufacturing method of polyaspartic acid with high yield and minimal heat degradation comprising the steps of: a) reacting maleic anhydride and an alcohol to give monoalkyl maleate compound; b) reacting thus obtained monoalkyl maleate compound and ammonia gas or an aqueous solution of ammonia to give a reaction solution of an ammonium salt of a monoalkyl maleate; c) adding an amide polar solvent without active hydrogen to thus obtained reaction solution of an ammonium salt of a monoalkyl maleate and heating the mixture to effect condensation polymerization for obtaining polysuccinimide; d) hydrolyzing the resulting polysuccinimide, while cooling and neutralizing the mixture to obtain polyaspartic acid; and e) separating the amide polar solvent from the polyaspartic acid to obtain polyaspartic acid in an aqueous solution, wherein high molecular weight polyaspartic acid having an average molecular weight from about 10,000 to about 20,000 and a carboxyl group content of at least 93% is obtained with a production yield of at least 98 mol %.

2. The manufacturing method of polyaspartic acid with high yield of claim 1, wherein 1 to 3 moles of alcohol per 1 mole of said maleic anhydride is reacted in said step a).

3. The manufacturing method of polyaspartic acid with high yield of claim 2, wherein a linear or branched alcohol having 1 to 12 carbon atoms is used.

4. The manufacturing method of polyaspartic acid with high yield of claim 1, wherein 0.8 to 2 moles of ammonia gas or an aqueous solution of ammonia per 1 mole of said monoalkyl maleate is reacted in said step b).

5. The manufacturing method of polyaspartic acid with high yield of claim 1, wherein the polar solvent of said step c) is employed in an amount of 100 to 400 parts by weight compared to the maleic anhydride used in said step a).

6. The manufacturing method of polyaspartic acid with high yield of claim 5, wherein at least one amide type solvent selected from n-methylpyrrolidone and dimethylformamide is used as said polar solvent.

7. The manufacturing method of polyaspartic acid with high yield of claim 1, wherein said condensation polymerization is carried out under normal atmospheric pressure at 160~220° C. for 3~11 hours in said step c).

8. The manufacturing method of polyaspartic acid with high yield of claim 7, wherein said condensation polymerization is carried out at 170~180° C. for 6~8 hours.

9. The manufacturing method of polyaspartic acid with high yield of claim 1, wherein said neutralization is carried out at 40~70° C. using an alkali metal or alkali earth metal till pH becomes 10~11 in said step d).

* * * * *

UNITED STATES PATENT AND TRADEMARK OFFICE
CERTIFICATE OF CORRECTION

PATENT NO. : 8,729,218 B2  Page 1 of 1
APPLICATION NO. : 12/442886
DATED : May 20, 2014
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this
Twenty-ninth Day of September, 2015

Michelle K. Lee
*Director of the United States Patent and Trademark Office*